United States Patent [19]
Roy

[11] 3,764,771
[45] Oct. 9, 1973

[54] APPARATUS ATTACHABLE TO AN EDM FOR ROTATING ELECTRODE

[75] Inventor: Henry Roy, Montreal, Quebec, Canada

[73] Assignee: DBM Industries Limited, Montral, Quebec, Canada

[22] Filed: July 20, 1971

[21] Appl. No.: 164,292

[30] Foreign Application Priority Data
Mar. 18, 1971 Canada.................. 108091

[52] U.S. Cl............................................. 219/69 V
[51] Int. Cl............................................. B23p 1/08
[58] Field of Search.............. 219/69 D, 69 E, 69 G, 219/69 V, 98; 314/69

[56] References Cited
UNITED STATES PATENTS
2,385,665  9/1945  Warwick.................... 219/69 V
3,125,700  3/1964  Bentley et al.................... 314/69
2,962,578  11/1960  De La Rosa.................... 219/98
2,485,361  10/1949  Condit et al..................... 219/69 V
2,580,398  1/1952  Braswell..................... 219/69 V X
3,430,026  2/1969  O'Connor..................... 219/69 V Primary Examiner—R. F. Staubly
Attorney—Cushman, Darby & Cushman

[57] ABSTRACT

A holder or supporting apparatus is described for use on an electrode discharge machine (EDM) for both holding and rotating an electrode. The apparatus utilizes a turbine wheel driven from the pressurized dielectric fluid available on an EDM, for rotating a chuck or collet in which the electrode is carried. Means are also provided to guide the electrode, using an interchangeable guide bushing to accommodate electrodes of various diameters.

7 Claims, 16 Drawing Figures

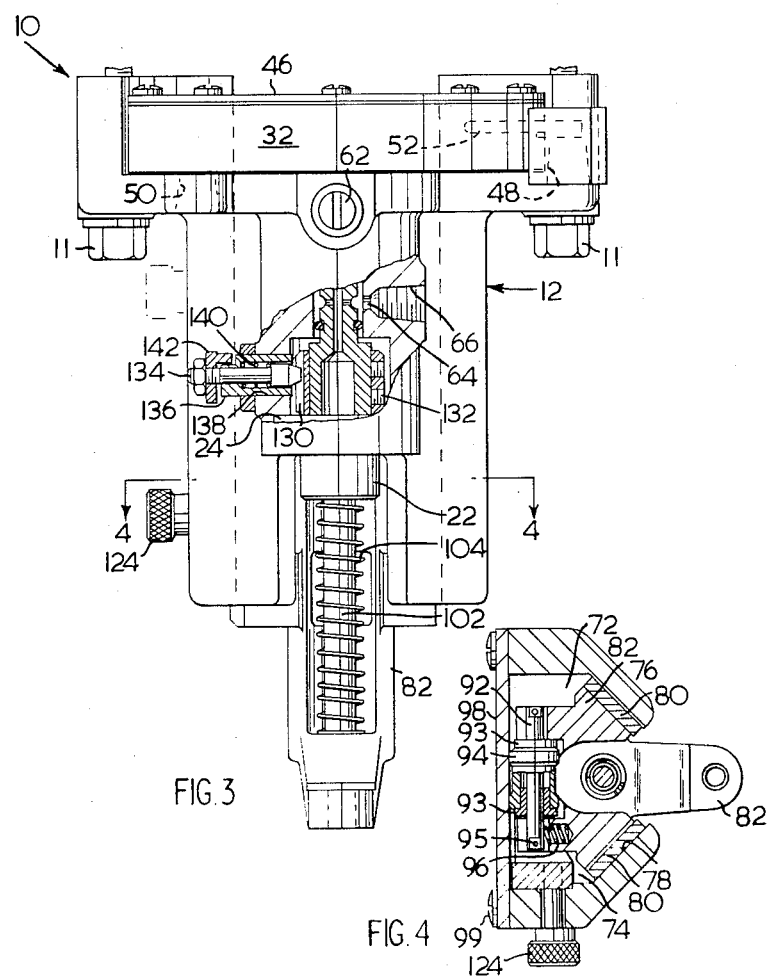

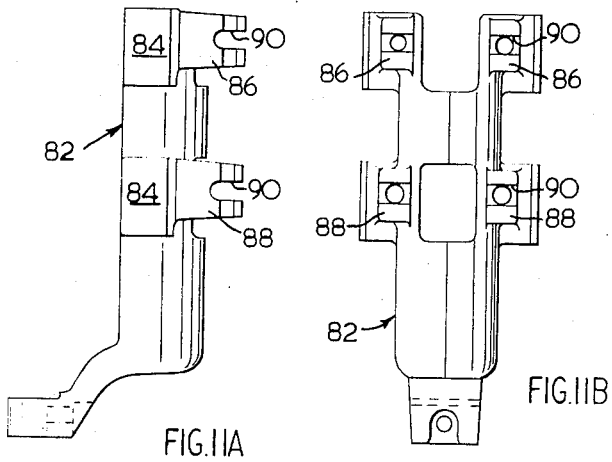
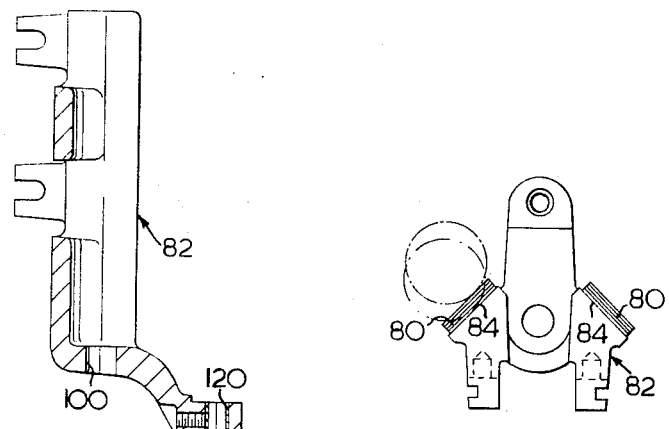

APPARATUS ATTACHABLE TO AN EDM FOR ROTATING ELECTRODE

This invention relates to apparatus used with known electrode discharge machines (EDM) to both support and rotate the electrode. More particularly, the invention relates to an electrode holder device which can be attached easily to any type of EDM and is light in weight.

BACKGROUND OF THE INVENTION

Various kinds of EDM's are known per se, including ones which both rotate and support the electrode used therewith, or which simply support the electrode. EDM's in which the electrode is rotated are often provided with a small auxiliary electric motor mounted on the head of the EDM. Such a motor might be coupled, for instance, by a splined shaft to a drive spindle that carries a conventional three-jaw chuck. The chuck grips and supports the electrode. It is well known that the electrically conductive electrode used in an EDM is both small and fragile. These factors are often the source of difficulties arising from inadequate support of the electrode in the immediate vicinity of a workpiece, or even possible breakage. Since it may be desirable to use an electrode of a selected one of a number of possible sizes, i.e., diameters, prior art EDM's were not always readily and quickly modified to accommodate changes in electrode size. Inefficient operation of the EDM was therefore a frequent companion to the situations noted above.

SUMMARY OF THE INVENTION

The present invention is believed to overcome a number of problems that have often been associated with prior art EDM's. An arrangement is described herein which utilizes the pressurized dielectric fluid available on any EDM to drive a turbine wheel. This wheel is operatively coupled, preferably through differential gearing, to a drive shaft that is adapted to be driven at a speed in the range from about 25 to 500 rpm in the working range. The drive shaft carries a chuck or collet which grips the electrode and enables the same to also be rotated. To improve the effectiveness of an EDM, the present invention also provides guide means that are positionable to receive and support the free end of an electrically conductive electrode. The guide means disable any appreciable amount of motion of the free end laterally of the axis of the electrode. Moreover, these guide means are adjustable to provide guided support of the free end of the electrode in the immediate vicinity of a workpiece. This is an important advantage since accurate positioning and guidance of the tip of the electrode allows higher quality work to be carried out.

In accordance with this invention, therefore, there is provided apparatus for use on an electrode discharge machine having a head and a supply of pressurized dielectric fluid, comprising: a chuck for gripping and supporting an electrically conductive electrode, the chuck being rotatably supported from the head of said machine; and a turbine wheel rotatably mounted to effect rotation of said chuck and electrode held therein, the turbine wheel being in a housing which is in fluid-flow communication with said supply of pressurized dielectric fluid, and being so positioned as to transform pressure energy in the fluid to kinetic energy causing rotation of the chuck and electrode.

In a preferred embodiment of the invention, a guide means is provided to disable any appreciable motion of the free end of the electrode laterally of the same. This guide means is positionable and preferably spring-biased (or loaded) to automatically locate the guide means adjacent a workpiece, thereby providing support and guidance of the electrode in the region where it is needed most.

It is an object of the invention, therefore, to provide an apparatus enabling improved operation of an EDM to be obtained. The present apparatus is readily attached to any EDM and is light in weight.

It is an object of one embodiment herein to provide apparatus by which an electrically conductive electrode in an EDM is rotatably driven by a turbine wheel. The wheel is driven by the supply of pressurized dielectric fluid that is available on such a machine.

It is a further object of a preferred embodiment herein to provide guide means that are adjustable to receive and guide the free end of an electrode that may be a selected one of a variety of sizes in diameter.

These and other objects and features of the invention will become apparent from the detailed description below, especially when read in conjunction with the accompanying drawings. These drawings illustrate by way of example only one preferred embodiment of the present invention.

DESCRIPTION OF THE DRAWINGS

FIG. 3 is a front elevation view of the apparatus of FIGS. 1 and 2;

FIG. 4 is a plan view taken in section along line 4—4 of FIG. 3;

DESCRIPTION OF THE PREFERRED EMBODIMENTS

Figure 2:
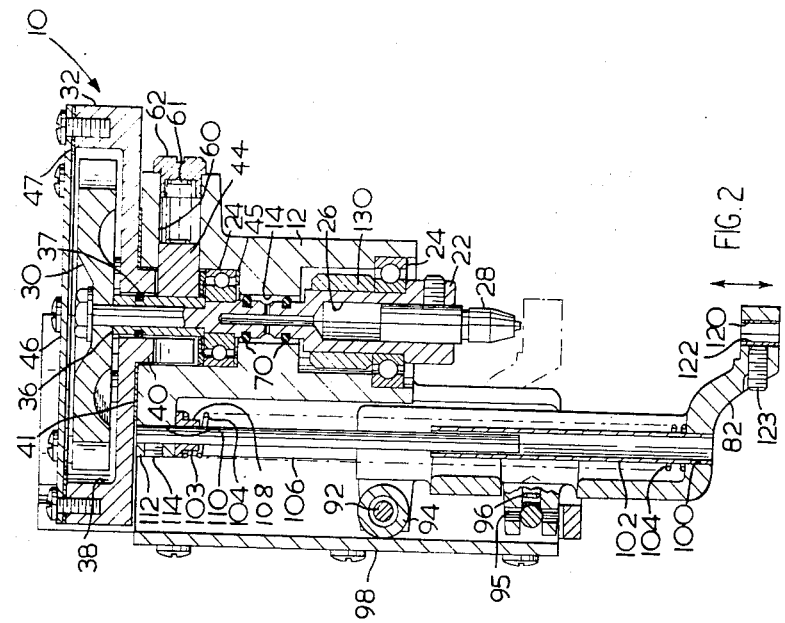
FIG. 2 is also a side elevation view taken partly in cross-section to show some details of the apparatus of FIG. 1.
Figure 1:
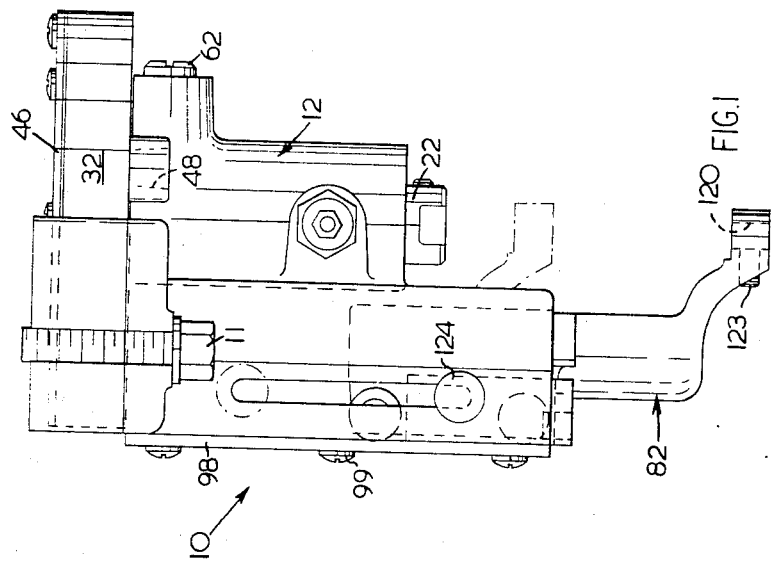
FIG. 1 is a side elevation view showing a preferred embodiment of the apparatus described herein.
Figure 5:
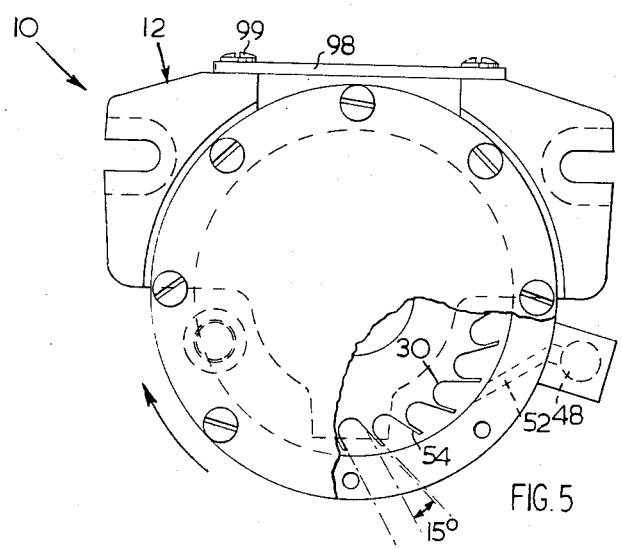
FIG. 5 is a top plan view of the apparatus of FIGS. 2 and 3, with the cover to the turbine housing removed, and showing a fragmentary portion of the turbine wheel in place.

Turning now to the drawings wherein the same reference numeral describes the same part in each figure, the following should be kept in mind in reading the description. The present invention is intended to be mounted on the head of a conventional electrode discharge machine (EDM). Such machines are known in this art, having regard to both their structure and operation. It will be recognized therefore that an EDM has a supply of pressurized dielectric fluid used during the spark erosion process. A "hydraulic" system is thus considered as being a part of each EDM, with the present apparatus being adapted to make use of that facility. An EDM and its structural features do not themselves form part of this invention. Hence, it is believed unnecessary to describe such a machine in any particular detail at this time.

Accordingly, FIGS. 1 to 5 show the present apparatus overall at 10. This apparatus 10 broadly comprises a base 12 made of H.R. steel for example and adapted to be secured to the head (not shown) of a conventional EDM by bolts 11. Structural details of the base 12 are shown in particular in FIGS. 6, 7, and 7A. As best seen in FIGS. 2 and 7A, the base 12 has a central opening 14 extending longitudinally therethrough which includes a diametrically enlarged upper recess 16, and a correspondingly-shaped lower recess 18. The recess 18 is further enlarged to provide a shoulder or bearing seat 20. A drive spindle or shaft 22 is received in the opening 14 and is rotatably supported on bearings 24 mounted in seat 20 and the inner end of recess 16. Details of the shaft 22 can be seen in FIG. 8. One end of the shaft 22 is provided with a blind axial borehole 26 that is adapted to receive and support a three-jaw chuck 28, or the like. The opposite end of shaft 22 is threaded and directly fastened to a turbine wheel 30 in the manner shown in FIG. 2. This wheel 30 can be made, for instance, from aluminum. In another form (not shown) the upper and small end of shaft or spindle 22 can be provided with gear means (driven) so adapted to engage with corresponding gear means (driving) secured to a turbine shaft on which turbine wheel 30 is fixedly mounted. Such an arrangement would give better flexibility in the range of speeds at which shaft 22 and the electrode (held in chuck 28) could be driven. Rotational speeds having a working range in the order, say, of from about 25 to 500 rpm would be obtained in that way.

Figures 9, 10:
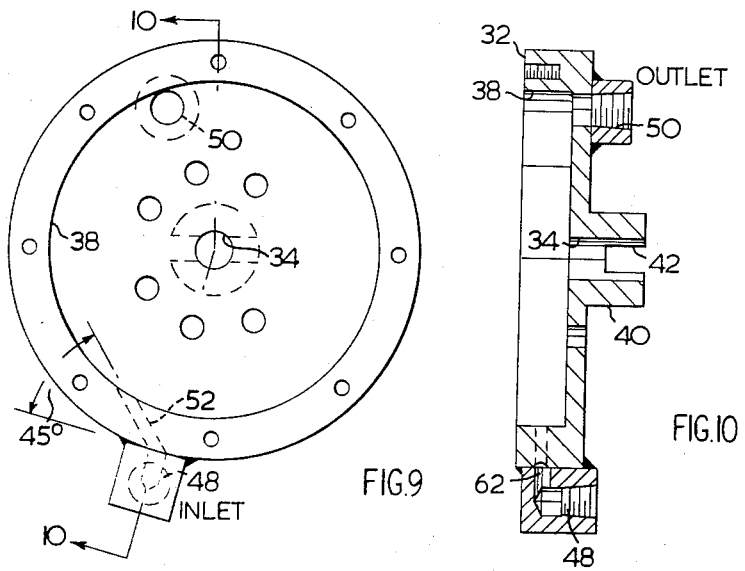
FIGS. 9 and 10 are top plan and side elevation views of the casing which houses the turbine wheel of the apparatus in FIG. 1, with FIG. 10 being taken in section along line 10—10 of FIG. 9.

The turbine wheel 30 is located in a turbine casing or housing 32 of H.R. steel which has a central opening 34 adapted to receive a spacer sleeve 36 on the exterior of which a resilient sealing ring 37 is provided. This sleeve 36 is of bronze and is press fitted over the small end of spindle 22. The housing 32 is dished out at 38 on one face to receive the turbine wheel 30, and has an axially extending flange 40 which receives a turbine gasket 41. The spigot-like flange 40 has a transverse slot or channel 42 therein and is received in the upper recess 16 of base 12. See FIGS. 9 and 10. A carbon brush 44 is disposed in one side of the channel 42 as shown in FIG. 2. As also seen in that figure, the sleeve 36 abuts against one face of a bearing seat provided on shaft 22, for bearing 24, which is itself seated on a gasket 45 at the closed end of recess 16.

The turbine casing 32 adapted to have at coverplate 46 screw fastened thereto in sealed engagement, as afforded by a gasket 47. In addition, inlet and outlet ports 48 and 50 respectively are formed in housing blocks welded to casing 32. An inflow passageway 52 is in flow communication with inlet port 48 to direct incoming pressurized dielectric fluid against vanes or blades 54 on the turbine wheel 30. This pressurized dielectric fluid is derived from the supply of the same available in any EDM.

Turning again to FIG. 2, it will be noted that the carbon brush 44 is inserted into place after assembly of the sleeve 36 on the spindle or shaft 22 and the turbine wheel 30. Insertion of the brush 44 is through an orifice 60 formed in the base 12. See FIG. 7A also. The brush 44 is retained in place under bias by a spring 61 and a cap 62 screw-threaded into the outer end of the orifice 60. Electric current is therefore supplied to the electrode from a suitable power source on the EDM by brush 44, through bronze sleeve 36, the spindle 22 and the chuck 28. It will be recognized that the maximum length of electrode which is utilized with the present apparatus is limited by the depth of borehole 26. If desired, bearings 24 could be electrically insulated from base 12 to prevent arcing in bearings.

As stated earlier, all EDM's have a source of pressurized dielectric fluid. This fluid is used to promote spark erosion and to flush away material removed in that manner. The base 12 is therefore provided with a transversely extending port 64 (FIG. 3) that connects to the narrow part of the central opening 14. This port 64 is formed in the bottom end of a recess 66 that is threaded to receive a coupling (not shown). That coupling is usually associated with pipe or hose means used to supply the dielectric fluid under pressure. A pair of transversely extending boreholes 68 (FIG. 8) enable that fluid to be conducted from port 64 into the longitudinal borehole 26 in spindle 22. Resilient O-ring seals 70 are provided on the spindle 22 to prevent seepage of the dielectric fluid beyond the portion of opening 14 in the immediate area of port 64.

Figure 11:
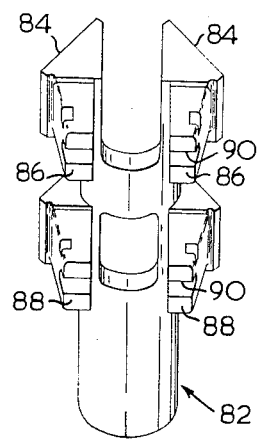
FIG. 11 is a perspective view of the holder for the electrode guide element in the apparatus of FIG. 1; and, FIGS. 11A to 11D are various top plan and elevational views of the holder of FIG. 11.
Figure 6:
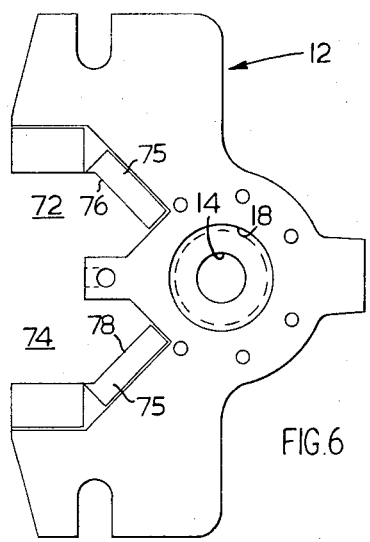
FIG. 6 is a top plan view of the base element in the apparatus of FIG. 1.
Figure 7:
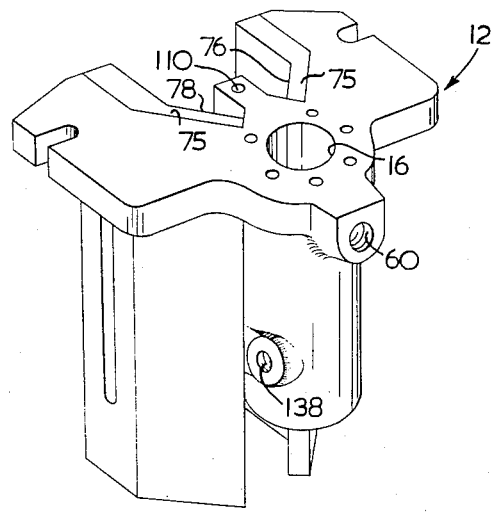
FIG. 7 is a perspective view of the base element of FIG. 6.
Figures 7A, 8:
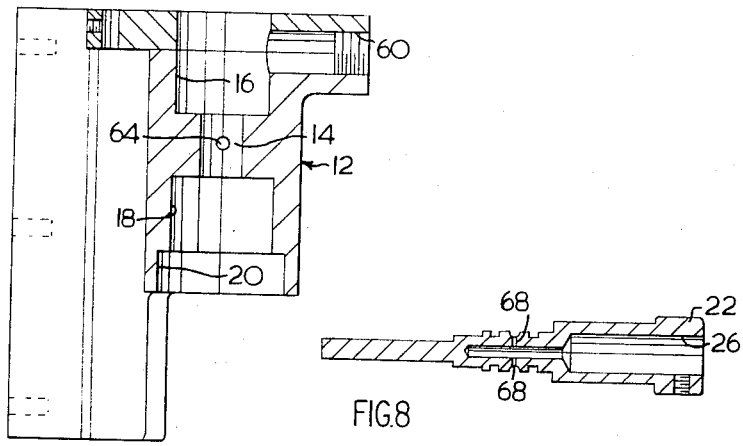
FIG. 7A is a side elevation view taken partly in section of the base element of FIG. 6.
FIG. 8 is a side elevation view in cross-section coaxially of the drive spindle or shaft of the apparatus in FIG. 1.

With reference to FIG. 6, the base 12 is formed with "bearing" chambers 72 and 74. A pair of bearing blocks 75 are welded to the base 12, and have guide surfaces 76 and 78 machined thereon. The surfaces 76 and 78 lie in planes located at 90° to one another, as well as being parallel to the axis of central opening 14. These surfaces 76 and 78 are engaged by low-friction pads 80 (FIG. 4) which are of tetrafluoroethylene (known under the DuPont trademark "TEFLON") or similar material. Alternatively, the pads 80 could be replaced by needle bearings electrically insulated from the body of a guide element 82 by a "TEFLON" liner. Structural details of this guide element 82 are shown in FIGS. 11 to 11D. Basically, the guide element 82 is roughly L-shaped and has two wing-like shoulders or projections 84 on the faces of which the "TEFLON" pads 80 are bonded. As in the case of the bearing surfaces 76 and 78, the faces of shoulders 84 are in planes at 90° to one another, and parallel to the axis of central opening 14 in the base 12. The guide element 82 is formed with two pairs of mounting lugs 86 and 88 (FIGS. 11A and 11B) which face away from the shoulders 84. Slots 90 are provided in each lug 86 and 88 for receiving and supporting a roller shaft 92 (FIGS. 2 and 4). A roller 94 is rotatably mounted on flanged bearings 93 on the shaft 92. As seen in FIG. 4, the shaft 92 has both ends connected to roll pins 95, both ends thereof being biased by a stiff spring 96. The spring 96 causes the roller 94 to be biased against a back cover plate 98. However, since coverplate 98 is fixedly secured to the base 12 by screws 99, the net result is to keep "TEFLON" bearing pads 80 in close contact with guide surfaces 76 and 78. In an alternative embodiment mentioned earlier, using needle or roller bearings instead of the pads 80, the spring 96 would serve to "spring load" such bearings as well. In any event, the guide element 82 is to be maintained in snug contact with base 12 to disable any play or other unwanted looseness.

With reference again to FIGS. 1 to 3, the guide element 82 is provided with an axially extending central borehole 100 (FIG. 11C also). This borehole 100 has a metal sleeve 102 press-fitted into the same, for purposes of supporting a compression spring 104. The upper end of the spring 104 is maintained in place by a non-metallic shaft or rod 106 which is received in a flanged bushing 108 (FIG. 2) and a borehole 110 in a flanged top portion 112 of the base 12. A locking set screw 114 keeps rod 106 securely in place.

The nose or base portion of the L-shaped guide element 82 is formed with a borehole 120 which is adapted to receive a selected one of a series of interchangeable guide bushings 122. The bushing 122 can be changed to accommodate electrodes of varying diameters. A locking set screw 123 also serves to keep the bushing 122 secured firmly in place.

It will be recognized that the spring 104 biases guide element 82 into contact with a workpiece (not shown), and maintains the same. The lower end of the guide element 82 and workpiece are immersed in a container holding the dielectric fluid mentioned earlier. This arrangement is well known in the art. In order to accommodate positioning and locking the guide element 82 at some vertical location a locking thumbscrew 124 is provided (FIG. 3).

As stated earlier, the present apparatus provides an arrangement for holding and rotating an electrically conductive electrode. Should the present apparatus be intended for use where no rotation of the electrode is wanted, the drive spindle 22 can be locked. To facilitate that, a lock ring 130 is screw-fastened as shown at 132 to the spindle 22. A locking pin 134 has a V-shaped nose to engage a correspondingly-formed groove on the ring 130 and prevent rotation of the spindle 22. It can be seen from FIG. 2 that the pin 134 is mounted in a bushing 136 that is threaded into an orifice 138 formed in the base 12. The pin 134 is biased into engagement with ring 130 by a spring 140 which is mounted on the threaded bushing 136. Locking means shown at 142 serve to disable unintended release or engagement of the system just described for locking spindle 22 when desired.

The foregoing description has set out a preferred embodiment of the present apparatus, as well as suggesting some modifications and changes. It is contemplated within the spirit of this invention to include all such changes and modifications as would be obvious to those skilled in this art within the scope of the claims below.

I claim:

1. Apparatus for attachment to an electrode discharge machine having an electrically conductive electrode, a head, and a supply of pressurized dielectric fluid, said apparatus being operable to support and rotatably drive the electrode on said machine, the apparatus comprising:
   a base member enabling the apparatus to be secured selectively and removably to the head of the electrode discharge machine;
   a drive spindle supported by said base member for rotation, the drive spindle being adapted to releasably retain chuck means at one end thereof to grip and carry one free end of the electrode;
   a sealable housing connected to the base member and adapted to be placed in fluid-flow communication with said supply of pressurized dielectric fluid;
   a turbine wheel enclosed by said housing and mounted for rotation therein, the turbine wheel being drivingly secured to an other end of the drive spindle and operable to transform pressure energy in dielectric fluid pumped through said housing to kinetic energy causing rotation of the drive spindle and chuck means and electrode carried thereby; and
   guide means moveably mounted on the base member to be positionable axially of the electrode, the guide means being operable to receive and guidedly support the other free end in close proximity to a workpiece, thus inhibiting any appreciable motion of said free end of the electrode laterally thereof.

2. The apparatus defined in claim 1, wherein differential gearing is provided and mounted on said apparatus to operatively couple said other end of the drive spindle to the turbine wheel, thereby accommodating a range of speeds at which the chuck means and electrode can be rotated.

3. The apparatus defined in claim 1, wherein the guide means is slideably movable along a track, and is spring-loaded to enable the guide means to be automatically positioned adjacent said workpiece.

4. The apparatus defined in claim 1, wherein the guide means is provided with roller bearings to facilitate said axial positioning with minimal friction being generated at surfaces having relative motion therebetween.

5. Apparatus for attachment to an electrode discharge machine having a head, an electrically conductive electrode with one free end, and a pressurized supply of dielectric fluid, said apparatus being operable to support and rotatably drive said electrode, comprising:
   a base adapted to enable the apparatus selectively to be secured to the head of said machine, the base having a central opening therein;
   a drive spindle rotatably mounted in said central opening, said drive spindle having a blind opening extending axially, said blind opening being operative to receive the other end of said electrode and having a diametrically enlarged open end which is adapted to support a chuck that grips and holds said electrode;
   a sealable housing connected to the base member and adapted to be placed in fluid-flow communication with the pressurized supply of dielectric fluid;
   a turbine wheel enclosed by said housing and mounted for rotation therein, said turbine wheel being drivingly connected to the drive spindle and functioning to transform pressure energy of dielectric fluid pumped through said housing into kinetic energy causing rotation of the electrode; and
   guide means for guiding and supporting the free end of the electrode from any appreciable motion laterally of the axis of said electrode, the guide means being mounted on said base, to enable said free end to be positionable in close proximity to a workpiece from which material is to be removed by spark erosion, the guide means providing such guided support of the free end of the electrode.

6. The apparatus defined in claim 5, wherein differential gearing is provided, being carried by said apparatus to operatively couple said drive spindle to the turbine wheel, thereby providing controlled adjustability within a range of speeds of rotation of the chuck and electrode.

7. The apparatus of claim 5, wherein the guide means is provided with roller bearings to facilitate said axial positioning with minimal friction of surfaces having relative motion therebetween.

* * * * *